United States Patent
Wang et al.

(10) Patent No.: US 10,830,654 B2
(45) Date of Patent: Nov. 10, 2020

(54) ROBUST TORQUE SENSOR WITH MODERATE COMPLIANCE

(71) Applicant: Flexiv Ltd., Santa Clara, CA (US)

(72) Inventors: Shiquan Wang, Foster City, CA (US); Hao Jiang, Mountain View, CA (US)

(73) Assignee: Flexiv Ltd., Grand Cayman (KY)

( * ) Notice: Subject to any disclaimer, the term of this patent is extended or adjusted under 35 U.S.C. 154(b) by 0 days.

(21) Appl. No.: 16/113,059

(22) Filed: Aug. 27, 2018

(65) Prior Publication Data
US 2019/0064015 A1 Feb. 28, 2019

Related U.S. Application Data

(60) Provisional application No. 62/550,388, filed on Aug. 25, 2017, provisional application No. 62/721,377, filed on Aug. 22, 2018.

(51) Int. Cl.
*G01L 3/10* (2006.01)
*G01L 3/08* (2006.01)

(52) U.S. Cl.
CPC .............. *G01L 3/101* (2013.01); *G01L 3/08* (2013.01); *G01L 3/10* (2013.01)

(58) Field of Classification Search
CPC .............. G01L 3/101; G01L 3/08; G01L 3/10
USPC .................................................. 73/862.321
See application file for complete search history.

(56) References Cited

U.S. PATENT DOCUMENTS

| | | | |
|---|---|---|---|
| 6,094,980 A * | 8/2000 | Larson | G01N 3/00 73/161 |
| 6,427,542 B1 * | 8/2002 | Nicot | B62D 6/10 180/422 |
| 6,694,828 B1 | 2/2004 | Nicot | |
| 9,003,896 B2 * | 4/2015 | Nold | G01L 3/1457 73/862.042 |

(Continued)

FOREIGN PATENT DOCUMENTS

WO 2011060092 5/2011
WO 2012015183 2/2012

OTHER PUBLICATIONS

International Search Report and Written Opinion for corresponding International Application No. PCT/IB2018/056508, dated Dec. 26, 2018; (12 pages).

(Continued)

*Primary Examiner* — Octavia Hollington
(74) *Attorney, Agent, or Firm* — K&L Gates LLP

(57) ABSTRACT

A torque sensor is provided that includes a deformable plate that includes an inner part and an outer part. The torque sensor may also include one or more elastic elements that connect the inner part and the outer part. The torque sensor may also include a transducer mounting plate that is rigidly connected to the inner part of the deformable plate. In certain embodiments, the elastic elements include at least one serpentine-shaped elastic element. In other embodiments, the elastic elements may include a beam structure. In some embodiments, the torque sensor includes a plurality of zeroing pins and zeroing pin slots which, when engaged, constrain the rotation of the torque sensor to a smaller zeroing range. In certain embodiments, the torque sensor may also include a plurality of hard stop pins that engage a stopping when an applied torque exceeds a predetermined threshold.

12 Claims, 5 Drawing Sheets

(56) References Cited

U.S. PATENT DOCUMENTS

| | | | | |
|---|---|---|---|---|
| 9,274,014 B2* | 3/2016 | Janik | ............ | G01L 5/16 |
| 10,239,213 B1* | 3/2019 | Reich | ............ | B25J 13/085 |
| 2009/0241691 A1 | 10/2009 | Bernstein et al. | | |
| 2011/0132157 A1 | 6/2011 | Duvan et al. | | |
| 2016/0116353 A1* | 4/2016 | Hulse | ............ | F16F 1/027 |
| | | | | 73/862.324 |
| 2019/0072443 A1* | 3/2019 | Reich | ............ | G01L 3/08 |
| 2020/0003645 A1* | 1/2020 | Jiang | ............ | G01L 3/1435 |

OTHER PUBLICATIONS

International Search Report for International Application No. PCT/IB2018/056508, dated Mar. 5, 2020 (7 pages).

\* cited by examiner

ROBUST TORQUE SENSOR WITH MODERATE COMPLIANCE

PRIORITY CLAIM

This application claims the benefit of priority under 35 U.S.C. § 119(e) to U.S. Provisional Patent Application Ser. No. 62/550,388, entitled "ROBUST TORQUE SENSOR WITH MODERATE COMPLIANCE" and filed on Aug. 25, 2017, and to U.S. Provisional Patent Application Ser. No. 62/721,377, entitled "ROBUST TORQUE SENSOR WITH MODERATE COMPLIANCE AND OVERLOAD PROTECTION" and filed on Aug. 22, 2018, the disclosures of which are herein incorporated by reference in their entirety.

BACKGROUND

Robotic arms are used in many industries to aid in manufacturing, assembly, research, and other operations. In certain applications, it is advantageous to use torque-control-based robot arms that utilize torque measurements to control robot arm movement. For example, torque control-based robot arms may enable more efficient real-time planning methods, which may be used to interact with complex manufacturing environment and to complete sophisticated tasks. Such robot arms rely on accurate torque measurements, so high-quality torque sensors are typically key components of torque-control-based robot arms.

SUMMARY

The apparatus disclosed herein provide low-cost torque sensor designs that have high precision, excellent compactness, moderate compliance, low weight, and effective overload protection mechanism. In one example, a torque sensor is provided comprising a deformable plate of robust material comprising an inner part and an outer part, one or more elastic elements, wherein the one or more elastic elements connect the inner part and the outer part, and at least one signal pair, wherein each signal pair comprises a signal emitter and a signal receiver.

In another example, the one or more elastic elements further compriseat least one serpentine-shaped elastic element that runs tangentially between the inner part and the outer part. In a further example, the serpentine-shaped elastic element forms multiple contacts with one or both of the outer part and the inner part when the torque applied about a central axis of the torque sensor exceeds a maximum torque threshold of the torque sensor. In a still further example, the elastic elements comprise at least two serpentine-shaped elastic elements, which are radially symmetric about a center of the deformable plate.

In another example, the signal emitter of the signal pair is mounted on the deformable plate. In a further example, the signal detector of the signal pair is mounted on the transducer mounting plate. In a still further example, the torque sensor further comprises at least one sensor shielding case located on the outer surface of the transducer plate and the deformable plate to cover the pair of signal generators and the signal detector.

In another example, the torque sensor further comprises a transducer mounting plate rigidly connected to the inner part of the deformable plate. In a further example, the one or more elastic elements further comprise a plurality of beam structures that connect the inner part to the outer part. In a still further example, the torque sensor further comprises a plurality of hard stop pins that engage a stopping means located on the deformable plate when a torque applied to the torque sensor exceeds a predetermined threshold.

In another example, the torque sensor further comprises a plurality of zeroing pins and a plurality of zeroing pin slots and, when the plurality of zeroing pins engage the plurality of zeroing means, rotation of the torque sensor is constrained to a smaller zeroing range.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Existing torque sensors include strain-gauge-based torque sensors and sensing mechanisms in serious elastic actuators (SEA). Each of these existing technologies have certain drawbacks. For example, strain-gauge-based sensors require sophisticated signal conditioning and do not have perfect overload protection. Also, SEAs require complex mechanical components and introduce significant compliance requirements for the system.

Further, existing torque sensors are often either too soft or too stiff. These issues may undermine the control system's response time or decrease the reliability and signal-to-noise ratio of the sensor. Sensors that are too soft usually include multiple elastic elements that store energy. These elastic elements are often bulky in size. Sensors that are too stiff are usually strain gauge-based and have poor overload protection and can therefore be damaged when an applied torque exceeds the maximum torque in the sensor's sensing range. Strain gauge-based torque sensors, which are the most common type, are vulnerable to manufacturing tolerances and temperature changes and often require sophisticated signal conditioning, which is generally performed by a separate apparatus. Under impact forces and torques, strain gauges and their bonding with the mechanical structure can experience signal creep, resulting in measurements that drift over time with use.

According to examples of the present disclosure, one novel way of solving these issues with preexisting torque sensors is to provide a deformable plate with elastic elements connecting an inner and an outer part of the deformable plate. The elastic elements may be designed to optimize the stiffness in a given torque sensing range and thereby avoid the issues with both soft and stiff sensors. The elastic elements may be, for example, serpentine-shaped or may have elastic beam structures. Additionally, in certain configurations the elastic elements may come into contact with the outer and/or inner part of the deformable plate when the maximum torque is exceeded, or may come into contact with multiple hard stop dowel pins. This contact may significantly increase the stiffness of the elastic elements when such torques are applied, providing better overload protection. Alternatively, the sensor assembly may include one or more hard stop dowel pins configured to engage when the torque applied exceeds a given threshold, thereby providing overload protection. Further, reversed polarity magnets may be used to create a linear magnetic field near a transducer used to measure a signal indicating the applied torque. Such a configuration helps reduce signal noise and thereby achieve adequate signal sensitivity.

Figure 1:
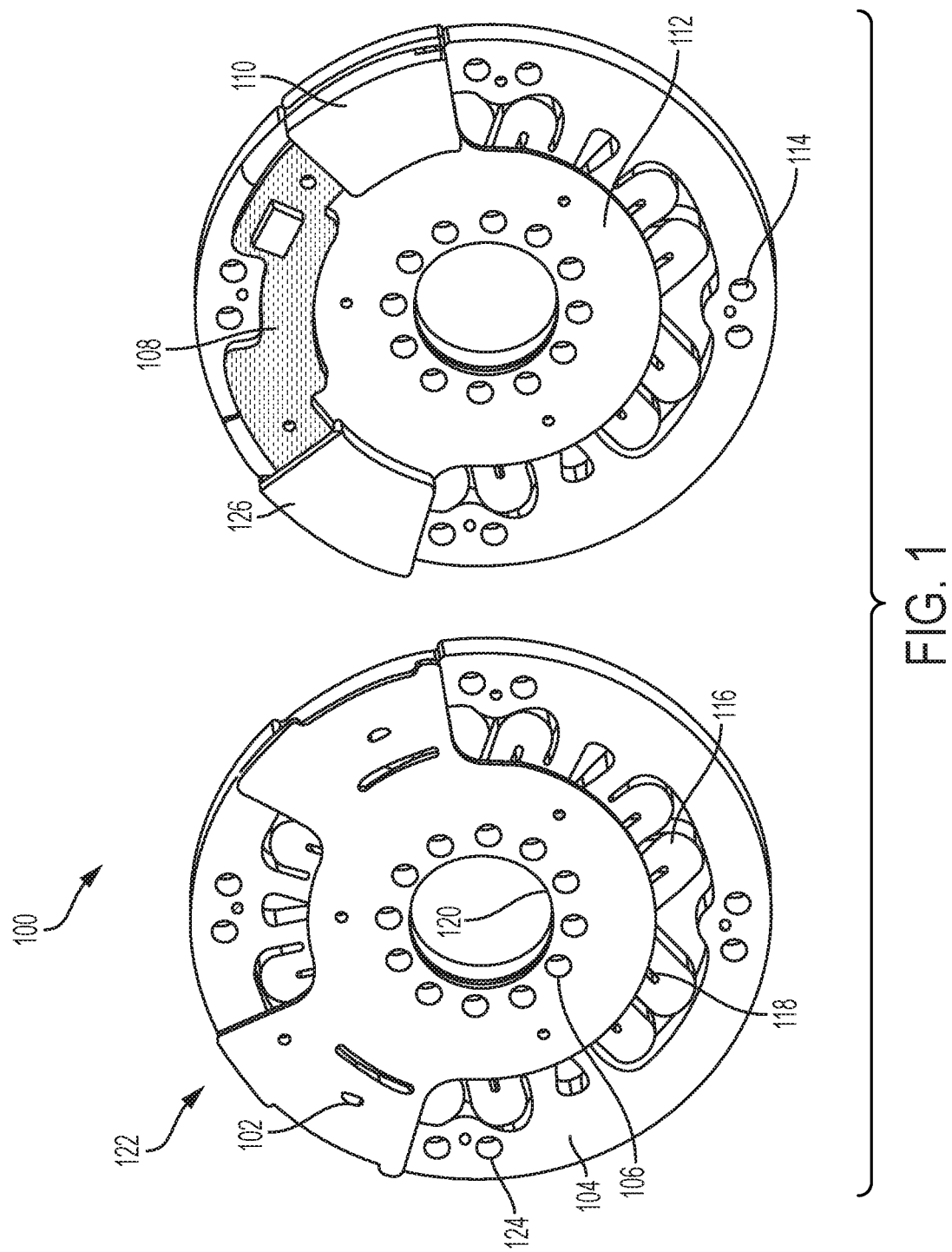
FIG. 1 illustrates a sensor assembly according to an exemplary embodiment of the present disclosure.

FIG. 1 is an exemplary embodiment of a sensor assembly 100 according to an embodiment of the present disclosure. The sensor assembly 100 includes a deformable plate 104 and a transducer plate 112. In certain embodiments, the deformable plate 104 and the transducer plate 112 may be made of one or more high robustness materials, such as aluminum alloy, titanium alloy, and stainless steel alloy. The deformable plate 104 may be designed as a one-part 2D flexure with an inner part 120 and an outer ring 122 connected with elastic elements, including elastic elements 116, 118.

Mounting features 106, 124 may be provided on the inner part 120 and the outer part 122. As depicted, the mounting features 106, 124 may include one or more circular mounting hole patterns, but other mounting features may include patterns of screw holes, dowel pins, rivets, wedges, or sensor geometry to form contacts and transmit torque and force. The mounting features 106, 124 may be used to apply, measure, and output torque transmission between the sensor assembly 100 and connected parts, such as other portions of the robotic arm. For example, if torque is applied at the inner part 120, the mounting features 106 surrounding the inner part 120 may be used to apply the torque and the mounting features 124 near the outer part 122 may be used to measure and/or output the torque transmission. Conversely, if torque is applied at the outer part 122, the mounting features 124 may apply the torque and the mounting features 106 may be used to measure and/or output the torque transmission.

The transducer plate 112 may be rigidly connected with the deformable plate 104 at the inner part 120. For example, the transducer plate 112 may only be rigidly connected with the deformable plate 104 via the mounting features 106 near the inner part 120. In certain embodiments, a signal detector may be installed in the transducer mounting pocket 102 (e.g., near the sensor circuits 108 in slot 204 depicted in FIG. 2) and a signal generator may be installed in the deformable plate 104 (e.g., signal emitters 212 depicted in FIG. 2). The signal detector may be configured to detect signals created by one or more sensor circuits 108 (e.g., signal emitters 212) in response to torque being applied to the sensor assembly 100. For example, the signal detector may be configured to detect one or more of magnetic signals, optical signals, or capacitive signals generated by the signal generator. To protect the sensor circuits 108 during operation, the sensor assembly 100 may also include one or more sensor shields 110, 126. In some implementations, the sensor shielding case 110, 126 may be made from high magnetic permeability material (e.g., MuMETAL®, Co-NETIC®, supermalloy, super mumetal alloys, Nilomag®, sanbold, molybdenum permalloy, Sendust, M-1040, Hipernom®, HyMu-80, and Amumetal) if magnetic signals are used. In other implementations, the sensor shields 110, 126 may be made from light blocking material (e.g., opaque plastics, metals, or rubber) if optical signals are used. Although depicted separately in FIG. 1, the deformable plate 104 and the transducer plate 112 may be machined as a single part in certain embodiments.

In operation, any circumferential displacement between the deformable plate 104 and the transducer plate 112 will cause displacement between the signal generator and signal detector. As depicted in FIG. 1, the two sections of sensor shielding case 110, 126 are installed on the outer surfaces of the transducer plate 112. The sections of sensor shielding case 110, 126 cover around the signal generator and the signal detector on the deformable plate 104, but leave a small gap between the sensor shielding case 110, 126 and the signal generator and signal detector when the sensor assembly 100 is assembled. This gap helps avoid direct contact between the sensor shielding case 110, 126 and the signal generator and signal detector in operation. The sensor shielding case 110, 126 protects any generated signal from being changed by factors other than the signal generator, such as magnetic or optical interference. As described above, the material used to make the sensor shielding case 110, 126 may be selected based on the types of signals being used. Sensor circuits 108 can be mounted on the transducer plate 112 and protected by the sensor shielding case 110, 126 to reject potential noise from the environment, e.g., magnetic or optical interference. The sensor circuits 108 may include one or more of an optical sensor, a magnetic sensor (e.g., a Hall effect sensor), a capacitive sensor, or similar sensors that can detect small displacements.

Figure 2:
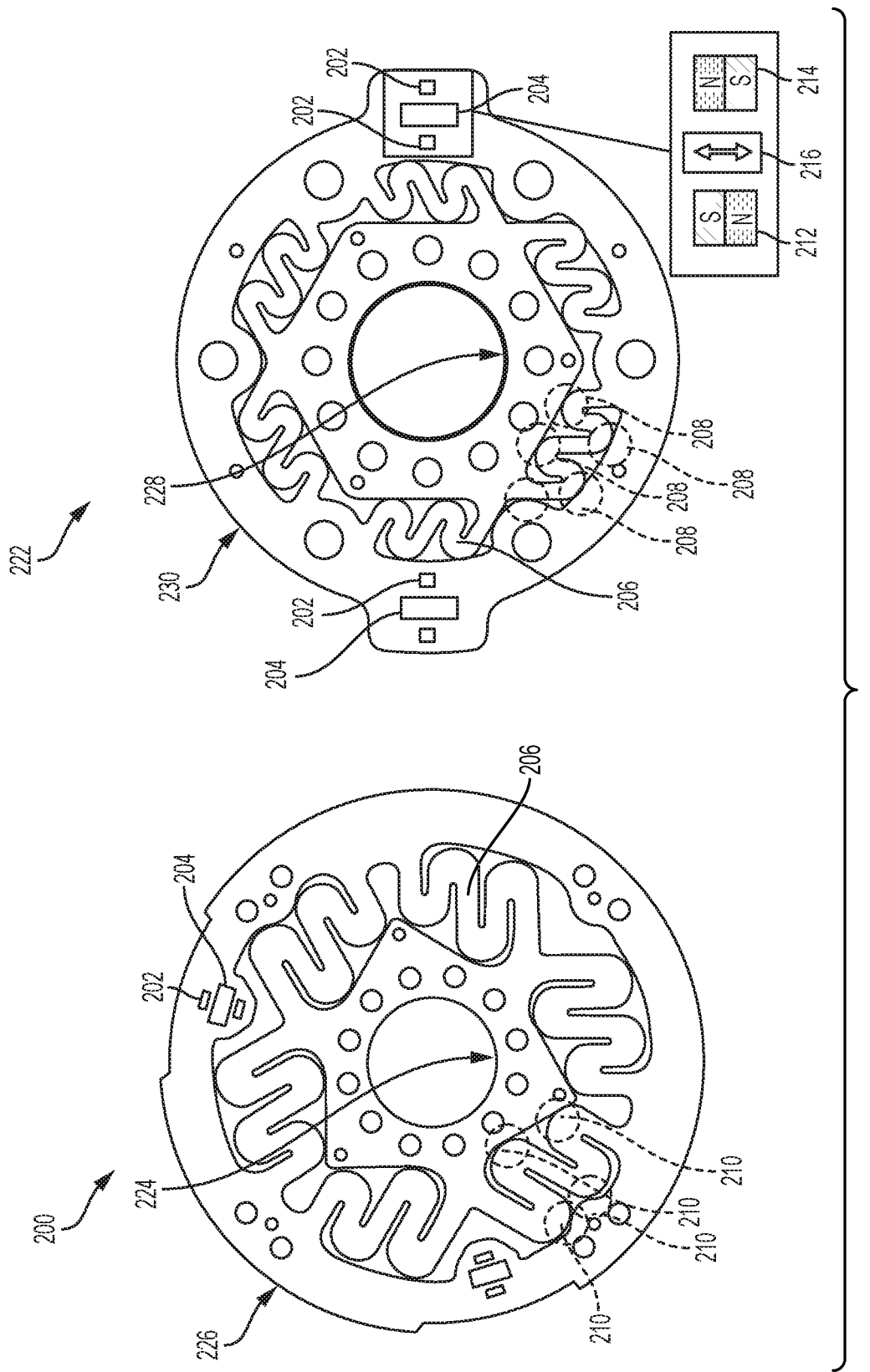
FIG. 2 illustrates deformable plates according to exemplary embodiments of the present disclosure.

FIG. 2 depicts two exemplary deformable plates 200, 222 according to embodiments of the present disclosure. The deformable plates 200, 222 may be used in a torque sensor assembly, such as the sensor assembly 100. In certain embodiments, the deformable plate 104 may be implemented as one of the deformable plates 200, 222. Both of the deformable plates 200, 222 are planar designs and may be machined with methods such as electrical discharge machining (EDM), water jet cutting, or laser cutting. Each deformable plate 200, 222 includes an inner part 224, 228 and an outer part 226, 230, connected with one or more elastic elements 206. The elastic elements 206 may be radially symmetric around the center of the deformable plate 200, 222. The geometry of the elastic elements 206 may be selected to optimize the energy stored in the deformable plates 200, 222 while also providing large enough deformation of the elastic elements 206 for a signal detector to properly detect the signal generated by a signal generator under torque loads within a sensing range of a sensor assembly 100. One exemplary elastic element 206 design, depicted in FIG. 2 is a serpentine shape that runs tangentially between the inner part 224, 228 to the outer part 226, 230. Another potential elastic element 206 design is a non-serpentine elastic beam between the inner part 224, 228 and outer part 226, 230. For example, the beam may have a varying or fixed width. Embodiments including an elastic beam are discussed below in connection with FIGS. 3, 4, and 5. The design of the elastic element 206 may be optimized to support particular load or deformation requirements. For example, more turns may be added to a serpentine-shaped elastic element 206 to increase the deformation, or fewer turns may be used if the elastic element 206 needs to withstand a higher load. In another example, an elastic beam may be selected to be thicker along one end in order to withstand larger torque loads, but may be thinner at the other end to provide enough deformation.

The elastic elements 206, such as serpentine-shaped elastic elements 206, may also be designed such that, when a maximum torque is applied according to the torque sensing range of a torque sensor assembly 100, the elastic elements 206 come into physical contact with the inner part 224, 228 and outer part 226, 230 at contact points 210, 208. This phenomenon may greatly increase the stiffness of the elastic elements 206 between the inner part 224, 228 and outer part 226, 230 and serve as an overload protection mechanism that prevents torque loads greater than the maximum torque from damaging the deformable plate 200, 222 or the sensor assembly 100.

The deformable plates 200, 222 also include signal generators 202 and signal detectors, whose configuration is selected to achieve good sensitivity. For example, as depicted in FIG. 2, the signal generator 202 of the deformable plate 222 includes two magnets 212, 214 with reversed polarity installed in two small pockets on the two sides of the transducer clearance pocket 204. The magnets 212, 214 in this configuration generate a linear magnetic field 216. A transducer plate 112, corresponding to the deformable plate 200, 222 in a sensor assembly 100 may include a Hall effect transducer installed on the transducer plate 112 (e.g., in the transducer mounting pocket 102) that extends out from the surface plane of the transducer plate 112. The transducer may then locate inside the transducer clearance pocket 204 of the deformable plate 200, 222. In certain embodiments, this arrangement may result in a magnetic field 216 in the sensing area (e.g., the transducer clearance pocket 204) large enough to enable proper signal generation. In this orientation, the transducer moves along the magnetic field 216 (i.e., parallel to the induction lines of the magnetic field 216). Other embodiments may be instead configured so that the transducer moves perpendicular to the magnetic field (i.e., across the induction lines of the magnetic field 216). In certain implementations, more than one pair of signal generator and signal detector can be configured to generate differential signals for better noise rejection.

Figure 3:
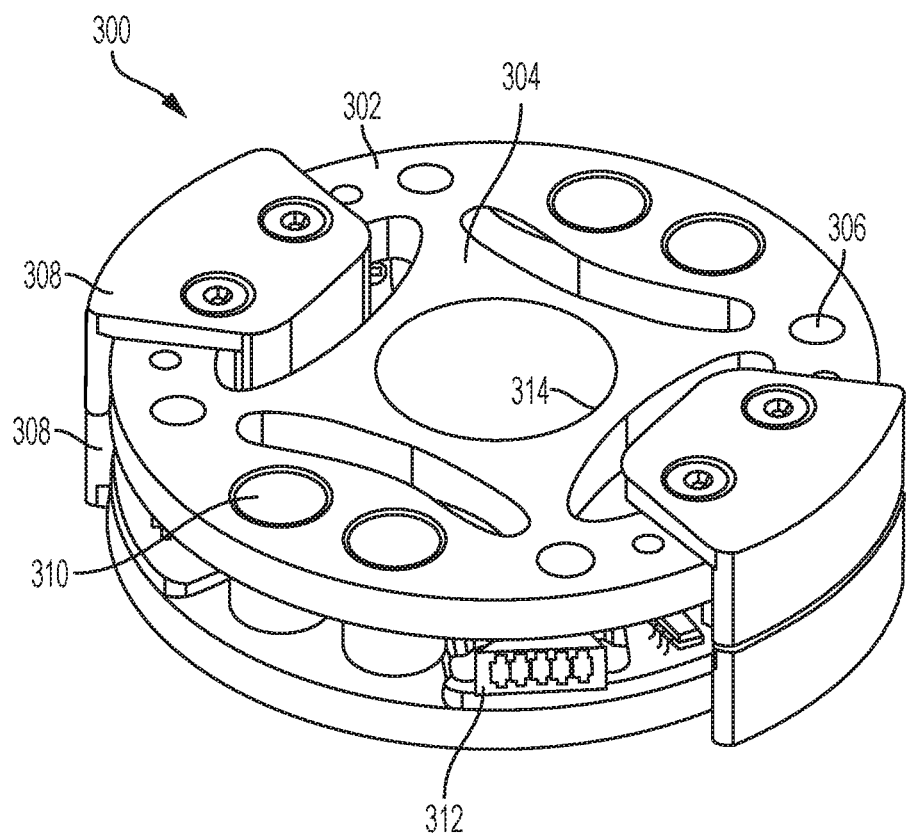
FIG. 3 illustrates a torque sensor assembly according to an exemplary embodiment of the present disclosure.

FIG. 3 depicts a torque sensor assembly 300 that includes an H-configuration elastic element 302, signal emitter and receiver pairs, corresponding shielding structures 308, and multiple hard stop dowel pins 310. The H-configuration elastic element 302 has two elastic disks and a rigid rod or tube 314 connecting the two disks together through the middle at the inner part of the elastic element 302, forming an H-shape rotated 90 degrees in FIG. 1 when viewed from the side. Each elastic disk has several beam structures 304 connecting the central rod or tube 314 and the outer part of the torque sensor assembly 300, on which the mounting features 306 are located. The H-configuration of the elastic element 302 enables the creation of a single machined part, which is free of connecting joints that can introduce hysteresis and backlash. Utilizing multiple elastic elements 302 for torque deflection increases the energy density of the torque sensor assembly 300, while also relieving the maximum stress applied to the torque sensor assembly 300.

Figure 4:
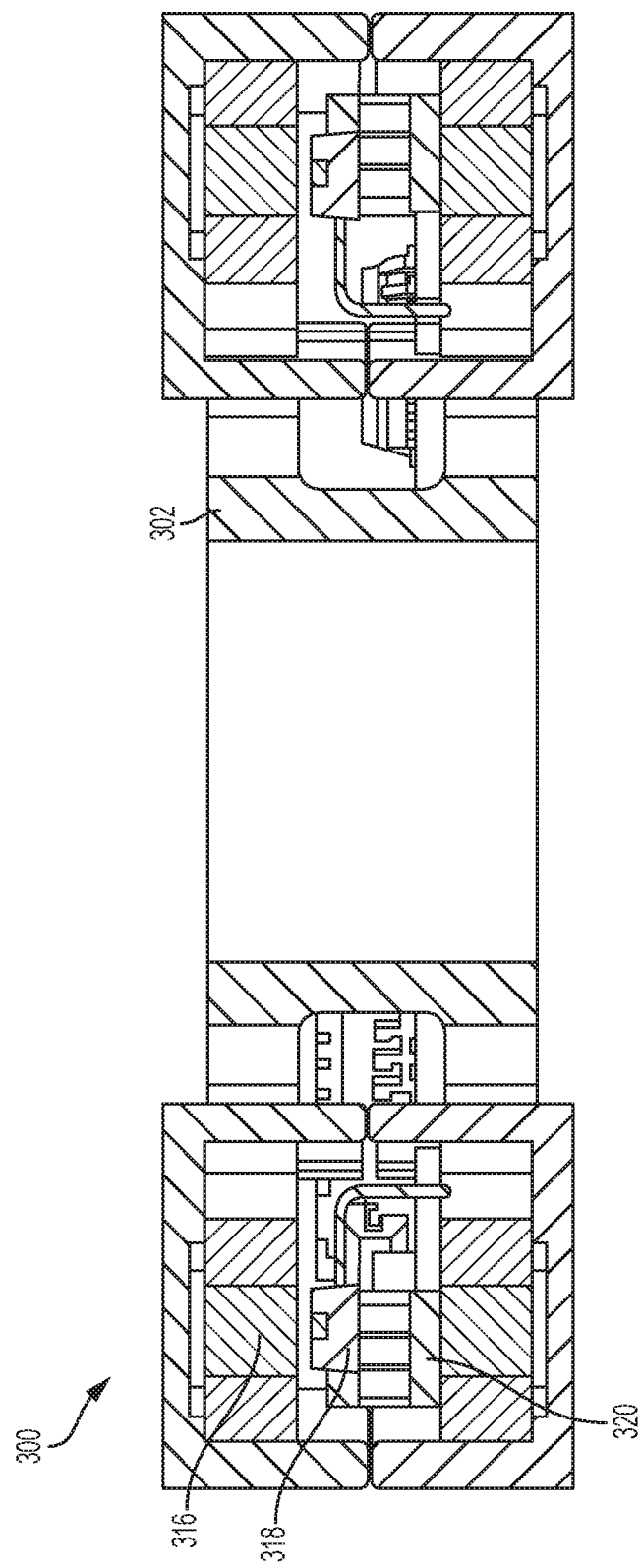
FIG. 4 illustrates a cross-sectional view of a torque sensor assembly according to an exemplary embodiment of the present disclosure.

As shown in FIG. 4, several signal emitter 316 and signal receiver 318 pairs may be installed on the elastic element 302, within the shielding structure 308. In one example, the signal emitter 316 may be a permanent magnet mounted on one elastic element 302, and the signal receiver 318 may be a Hall effect sensor fixed on a receiver carrier 320 mounted on the other elastic element, which is shown in FIG. 4. When an axial torque is applied to the mounting features 306 on the outer rims of the two elastic elements 302, the beam structures 304 of each elastic element 302 deflect so that the two disks of the elastic element 302 rotate axially with respect to each other. The beam structure 304 can be optimized with varying width, thickness or serpentine shapes for higher energy storage and lower stiffness, as discussed above. As a result, the deflection of the beam structure 304 and the resulting rotation of the elastic elements 302 is detected by the signal emitter 316 and signal receiver 318 pairs, and thus the torque can be computed. As depicted, the sensor assembly 300 has two signal emitter 316 and signal receiver 318 pairs installed at 180 degrees between the elastic elements 302. The two signal pairs are oriented such that they have opposite trends of signal changes when the beam structures 304 deflect under pure torque. However, when a bending moment in either axis is applied to the assembly, the signal pairs share the same trend of signal changes. Similarly, with a shear force parallel to the disks, the signal levels do not change for either signal pair. Also, signal changes caused axial forces can be compensated with additional signal pairs and peripheral mounting structures. The signal pairs also share the same trend of signal changes caused by temperature changes. Because of this configuration the pure torque applied on the sensor assembly 300 can be computed using differential methods between the readings from the signal pairs.

Several pairs of shielding structures 308 enclose the signal emitter 316 and signal receiver 318 pairs inside to prevent disturbances and interferences from the exterior environment. The shielding structures 308 may thereby significantly improve the accuracy and signal-to-noise ratio of the system 300. The hard stop dowel pins 310 may be mounted on one end to the lower disk of the elastic element 302, with the other end of the dowel pins 310 floating relative to the upper disk of the elastic element 302. When an excessive torque is applied, the large deflection causes the floating ends of the dowel pins 310 to contact the upper disk of the elastic element 302, and thereby prevent further deflection. This overload protection significantly reduces the yielding, hysteresis, and fatigue risks of the elastic element 302.

Figure 5:
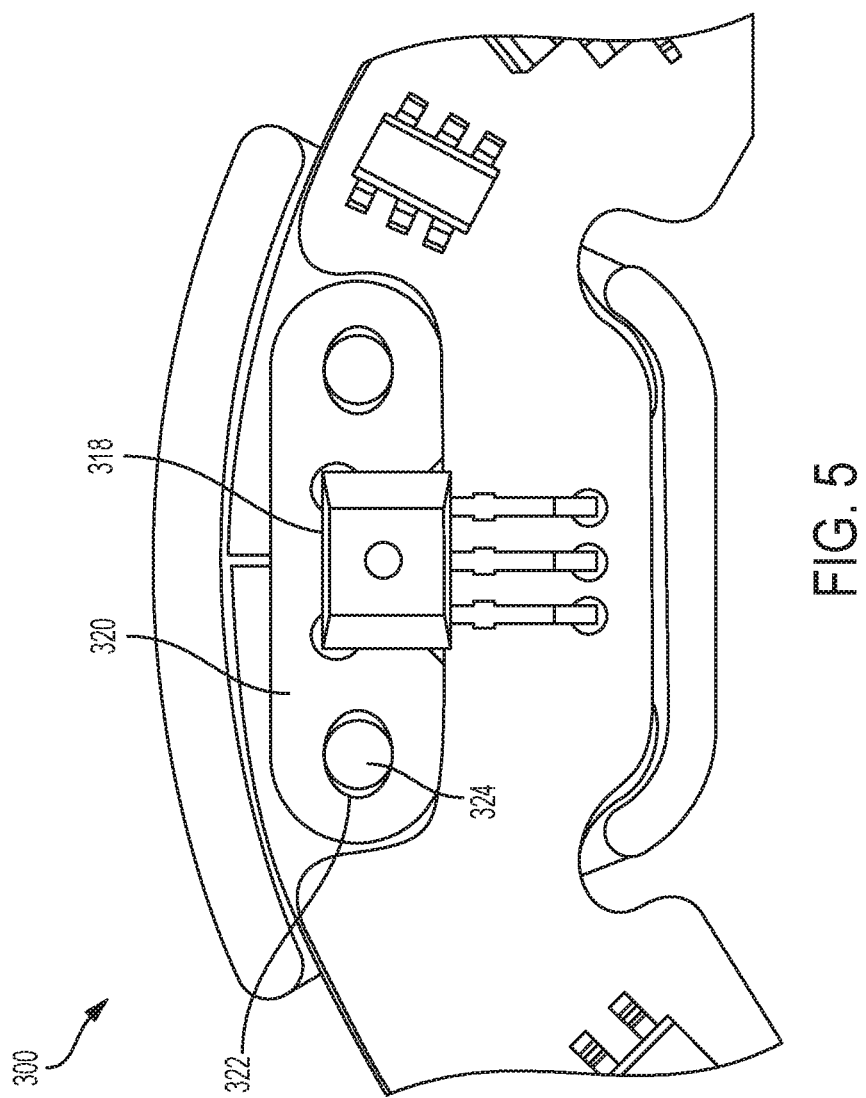
FIG. 5 illustrates a zeroing mechanism of a torque sensor assembly according to an exemplary embodiment of the present disclosure.

Due to manufacturing tolerances and assembling imperfections, the initial relative position of the signal emitter 316 and signal receiver 318 pair cannot be guaranteed to achieve a zero-signal level. In certain instances, the initial signal level may be so off that the sensor output saturates significantly before a full-scale torque is applied, reducing accuracy and sensor range. As shown in FIG. 5, combinations of dowel pins 324 and slot holes 322 may be implemented to compensate for this initial signal error. The dowel pins 324 may be fixed on the lower elastic element 302 with one end extending into the slightly larger slot holes 322 on the receiver carrier 320. In another embodiment, a different design with slots on the elastic element instead of holes may be used. In a further embodiment, the pins 324 may be fixed to the receiver carrier 320 to achieve the same effect. As a result, the receiver carrier 320 and the signal receiver 318 can move together slightly between the two dowel pins, and this motion can be used to identify the zero-signal position. Once located, the receiver carrier 320 can be rigidly mounted on the lower disk with, e.g., adhesive, fastening hardware, screws, bolts.

The above-discussed torque sensor designs have the advantages of (1) optimal compliance for desired torque loads, (2) overload protection which reduces how often the torque sensor assembly 100, 300 requires recalibration after undertaking torque much larger than sensor sensing range, (3) generating an optimal magnetic field or other sensing field to generate sufficient signals, (4) providing effective shielding from magnetic, optical, capacitive, and other signal interference, (5) lower cost and more reliable manufacturability, (6) improved manufacturing tolerance compensation at the time of sensor deployment, (7) good suppression of inter-axis crosstalk with differential methods, (8) good stability to temperature changes, and (9) low cost.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A torque sensor comprising:
    a deformable plate of robust material comprising an inner part and an outer part;
    one or more elastic elements, wherein the one or more elastic elements connect the inner part and the outer part; and
    at least one signal pair, wherein each signal pair comprises a signal emitter and a signal receiver,
    wherein the one or more elastic elements are configured such that the one or more elastic elements contact at least one of the inner part and the outer part at one or more contact points in response to a torque applied about a central axis of the torque sensor exceeding a maximum torque threshold of the torque sensor.

2. The torque sensor of claim 1, wherein the one or more elastic elements further comprise:
    at least one serpentine-shaped elastic element that runs tangentially between the inner part and the outer part.

3. The torque sensor of claim 2, wherein the elastic elements comprise at least two serpentine-shaped elastic elements, which are radially symmetric about a center of the deformable plate.

4. The torque sensor of claim 1, wherein the signal emitter of the signal pair is mounted on the deformable plate.

5. The torque sensor of claim 4, further comprising a transducer mounting plate, wherein the signal receiver of the at least one signal pair is mounted on the transducer mounting plate.

6. The torque sensor of claim 5, wherein the transducer mounting plate includes a transducer clearance pocket and two magnet pockets, the two magnet pockets located on opposing sides of the transducer clearance pocket,
    wherein the signal emitter includes two magnets with reversed polarity, each respective magnet installed in a respective magnet pocket, and
    wherein the signal receiver includes a Hall effect transducer extending inside the transducer clearance pocket.

7. The torque sensor of claim 1, further comprising:
    a transducer mounting plate; and
    at least one sensor shielding case located on an outer surface of the transducer plate and the deformable plate to cover the at least one signal pair.

8. The torque sensor of claim 1, further comprising:
    a transducer mounting plate rigidly connected to the inner part of the deformable plate.

9. The torque sensor of claim 1, wherein the one or more elastic elements further comprise:
    a plurality of beam structures that connect the inner part to the outer part.

10. The torque sensor of claim 9, further comprising:
    a plurality of hard stop pins configured to contact the deformable plate when a torque applied to the torque sensor exceeds a predetermined threshold.

11. The torque sensor of claim 1, further comprising:
    a plurality of zeroing pins; and
    a plurality of zeroing pin slots,
    wherein, when the plurality of zeroing pins engage the plurality of zeroing pin slots, rotation of the torque sensor is constrained to a smaller zeroing range.

12. The torque sensor of claim 1, further comprising a plurality of signal pairs, and wherein the plurality of signal pairs are oriented such that non-torque loads applied to the torque sensor cause the signal emitters to emit signals that cancel out under differential analysis.

* * * * *